United States Patent
Hill et al.

(10) Patent No.: US 12,271,407 B2
(45) Date of Patent: Apr. 8, 2025

(54) SYSTEMS AND METHODS FOR IMPLEMENTING A VIRTUAL AGENT PERFORMING CONTEXT AND QUERY TRANSFORMATIONS USING UNSUPERVISED MACHINE LEARNING MODELS

(71) Applicant: Knowbl LLC, Ponte Vedra Beach, FL (US)

(72) Inventors: Parker Hill, Reno, NV (US); Sean Croskey, Canton, MI (US); Alexander Speicher, Ann Arbor, MI (US)

(73) Assignee: Knowbl Inc., Ponte Vedra Beach, FL (US)

( * ) Notice: Subject to any disclaimer, the term of this patent is extended or adjusted under 35 U.S.C. 154(b) by 0 days.

(21) Appl. No.: 18/137,771

(22) Filed: Apr. 21, 2023

(65) Prior Publication Data
US 2023/0350928 A1    Nov. 2, 2023

Related U.S. Application Data

(60) Provisional application No. 63/335,832, filed on Apr. 28, 2022.

(51) Int. Cl.
*G06F 16/332*  (2019.01)
*G06F 16/3329*  (2025.01)
(Continued)

(52) U.S. Cl.
CPC ........ *G06F 16/3329* (2019.01); *G06F 40/284* (2020.01); *G06F 40/40* (2020.01)

(58) Field of Classification Search
CPC ..... G06F 16/3329; G06F 40/284; G06F 40/40
See application file for complete search history.

(56) References Cited

U.S. PATENT DOCUMENTS 10,747,823 B1 *   8/2020   Birnbaum .............. G06N 5/041
10,958,599 B1 *   3/2021   Penov .................... G06V 10/82
(Continued)

OTHER PUBLICATIONS

Chao, Guan-Lin, and Ian Lane. "BERT-DST: Scalable end-to-end dialogue state tracking with bidirectional encoder representations from transformer." arXiv preprint arXiv:1907.03040 (2019). (Year: 2019).*

(Continued)

*Primary Examiner* — Anne L Thomas-Homescu
(74) *Attorney, Agent, or Firm* — Padowithz Alce; Alce PLLC

(57) ABSTRACT

A computer-implemented method for improving a predictive response of a machine learning-based virtual dialogue agent includes identifying an unfilled dialogue slot associated with an active dialogue between a user and the machine learning-based virtual dialogue agent, obtaining subsequent dialogue input data based on prompting the user for the unfilled dialogue slot, and computing a value of the unfilled dialogue slot based on the obtaining of the subsequent dialog input, wherein computing the value of the unfilled dialogue slot includes computing, via a question-answering machine learning model, a slot answer inference comprising the value of the unfilled dialogue slot based on an input of a machine learning-derived query and machine learning-derived context computed for the unfilled dialogue slot.

20 Claims, 4 Drawing Sheets

(51) Int. Cl.
*G06F 40/284* (2020.01)
*G06F 40/40* (2020.01)

(56) References Cited

U.S. PATENT DOCUMENTS

| | | | |
|---|---|---|---|
| 11,386,890 B1* | 7/2022 | Fan | G06F 40/30 |
| 11,455,987 B1* | 9/2022 | Dabas | G10L 15/30 |
| 11,544,504 B1* | 1/2023 | Fan | G06F 18/2178 |
| 11,562,744 B1* | 1/2023 | Gao | G10L 15/26 |
| 11,567,788 B1* | 1/2023 | Khemka | H04L 67/55 |
| 11,574,637 B1* | 2/2023 | Kumar | G10L 15/22 |
| 11,605,376 B1* | 3/2023 | Hoover | G10L 15/22 |
| 11,646,035 B1* | 5/2023 | Fan | G10L 15/32 |
| | | | 704/270.1 |
| 11,797,610 B1* | 10/2023 | Ferrucci | G06F 40/30 |
| 2007/0033218 A1* | 2/2007 | Taylor | G06F 16/9535 |
| | | | 707/999.102 |
| 2015/0179168 A1* | 6/2015 | Hakkani-Tur | G10L 15/22 |
| | | | 704/257 |
| 2019/0147029 A1* | 5/2019 | Chiu | G06F 40/30 |
| | | | 715/226 |
| 2019/0212879 A1* | 7/2019 | Anand | G06Q 50/10 |
| 2020/0168214 A1* | 5/2020 | Mukherjee | G06F 17/18 |
| 2020/0279002 A1* | 9/2020 | Kim | G10L 15/18 |
| 2020/0334300 A1* | 10/2020 | Birnbaum | G06F 40/30 |
| 2021/0056169 A1* | 2/2021 | Bahirwani | G06N 7/01 |
| 2021/0090570 A1* | 3/2021 | Aharoni | H04M 1/02 |
| 2021/0117214 A1* | 4/2021 | Presant | H04L 67/535 |
| 2021/0120206 A1* | 4/2021 | Liu | G10L 15/1822 |
| 2021/0158811 A1* | 5/2021 | Di Fabbrizio | G06F 16/3329 |
| 2021/0264902 A1* | 8/2021 | Larson | G06F 40/35 |
| 2021/0314523 A1* | 10/2021 | Kamisetty | H04L 65/1069 |
| 2021/0409234 A1* | 12/2021 | Behar | G06Q 50/01 |
| 2022/0067278 A1* | 3/2022 | Huang | G06F 40/258 |
| 2022/0084510 A1* | 3/2022 | Peng | G06F 40/56 |
| 2022/0129556 A1* | 4/2022 | Chen | G06F 21/74 |
| 2022/0199079 A1* | 6/2022 | Hanson | H04L 51/02 |
| 2022/0210111 A1* | 6/2022 | Greenberg | H04L 67/12 |
| 2022/0230628 A1* | 7/2022 | Zhu | G10L 15/063 |
| 2022/0269870 A1* | 8/2022 | Goel | G06F 40/205 |
| 2022/0374605 A1* | 11/2022 | Sethi | G06F 3/04883 |
| 2022/0415320 A1* | 12/2022 | Zheng | G06F 40/237 |
| 2023/0118962 A1* | 4/2023 | Liu | G06F 16/951 |
| | | | 704/9 |
| 2023/0128422 A1* | 4/2023 | Li | G06F 3/013 |
| | | | 345/156 |
| 2023/0147096 A1* | 5/2023 | Getselevich | G06N 3/045 |
| | | | 704/9 |

OTHER PUBLICATIONS

Fuisz, Gabor, et al. "Improved and efficient conversational slot labeling through question answering." arXiv preprint arXiv:2204.02123 (2022). (Year: 2022).*

Namazifar, Mahdi, et al. "Language model is all you need: Natural language understanding as question answering." ICASSP 2021-2021 IEEE International Conference on Acoustics, Speech and Signal Processing (ICASSP). IEEE, 2021. (Year: 2021).*

Liu, Jian, et al. "Event extraction as machine reading comprehension." Proceedings of the 2020 conference on empirical methods in natural language processing (EMNLP). 2020. (Year: 2020).*

Ahmad, Zishan, et al. "Unsupervised approach for knowledge-graph creation from conversation: The use of intent supervision for slot filling." 2021 International Joint Conference on Neural Networks (IJCNN). IEEE, 2021. (Year: 2021).*

* cited by examiner

200

Configuring a Conversational Dialogue Agent S205

Receiving an Input or a Request from a User S210

Generating one or more Slot-Informative Questions S220

Deriving or Identifying Context for the one or more Slot-Informative Questions S230

Computing one or more Slot-Informative Answers S240

Managing or Modifying Values for one or more Slots Recognizable by the Conversational Dialogue Agent S250

Generating a Response to the User S260

FIGURE 2

SYSTEMS AND METHODS FOR IMPLEMENTING A VIRTUAL AGENT PERFORMING CONTEXT AND QUERY TRANSFORMATIONS USING UNSUPERVISED MACHINE LEARNING MODELS

CROSS-REFERENCE TO RELATED APPLICATIONS

This application claims the benefit of U.S. Provisional Application No. 63/335,832, filed 28 Apr. 2022, which is incorporated in its entirety by this reference.

TECHNICAL FIELD

This invention relates generally to the machine learning-based query response generation field, and more specifically, to a new and useful system and method for implementing a machine learning-based virtual agent.

BACKGROUND

Automated query response and/or query search systems may typically be deployed to enable users to discover answers to various questions. Many of the automated query response and/or search systems are naive, in operation, and often only use regular expression searching techniques to provide response to queries. A fundamental problem with such automated response systems may be their incapability to deliver useful responses to queries that may be posed in a manner inconsistent with patterns of potential responses in a search space. Accordingly, using regex or similar search techniques, these automated query response systems may fail in providing responses to non-conforming queries.

Additionally, in circumstances in which multiple related queries may be posed by a user in a querying session or the like, the automated query response systems may not be able to identify, much less, maintain a context of the multiple queries to enable a production of best responses to the multiple queries.

Thus, there is a need in the automated query search and response fields to create new and useful systems and methods for implementing machine learning-based context generation and intelligent context-informed query search and response. The embodiments of the present application described herein provide technical solutions that address, at least, the needs described above, as well as the deficiencies of the state of the art.

BRIEF SUMMARY OF THE INVENTION(S)

In some embodiments, a computer-implemented method for improving a predictive response of a machine learning-based virtual dialogue system, the computer-implemented method includes: identifying an unfilled dialogue slot based on computing a dialogue intent classification of dialogue input data provided by a user; generating, by a context transformer model, a contextualized response based on a context-transform pairing of the dialogue input data and the unfilled dialogue slot; generating, by a question transformer model, a contextualized question based on a question-transform pairing of the dialogue intent classification and a target unfilled slot associated with the dialogue intent classification; computing, by a span prediction model, a slot value of the unfilled dialogue slot based on an input of (a) the contextualized response and (b) the contextualized question; and automatically executing a set of pre-determined computer-executable instructions for performing a task in response to or responding to the dialogue input data based on the computing the slot value of the unfilled dialogue slot.

In some embodiments, the span prediction model comprises a question-answering machine learning model that is configured to receive a question-context input pairing comprising a target contextualized question and a target contextualized answer as a knowledgebase for the target question, the input to the question-answering machine learning model defines the contextualized question as the target contextualized question and the contextualized response as the knowledgebase, and the question-answering machine learning model computes the slot value of the unfilled dialogue slot by extracting an answer to the contextualized question from the contextualized response.

In some embodiments, the context transformer model comprises a language transformer model that is configured to convert one or more tokens provided as input into one or more contextualized declarative statements or sentences, and generating the contextualized response includes: providing the context-transform pairing as input to the language transformer model, and generating, via the language transformer model, a contextualized response inference comprising the contextualized response based on the providing the context-transform pairing as input.

In some embodiments, the contextualized response includes (a) declarative syntax and (b) one or more prompts or sentences comprising tokens corresponding to the dialogue input data and the unfilled dialogue slot, and the span prediction model uses the contextualized response as a knowledgebase for the contextualized question.

In some embodiments, the question transformer model comprises a language transformer model that is configured to convert one or more non-question tokens provided as input into a question, and computing the contextualized question includes: providing the question-transform pairing as input to the language transformer model, and generating, via the language transformer model, a question inference comprising the contextualized question based on the providing.

In some embodiments, the contextualized question includes (a) interrogative syntax, (b) at least one token corresponding to the dialogue intent classification, and (c) at least one token corresponding to the unfilled dialogue slot, and the contextualized question aids the span prediction model in extracting the slot value of the unfilled dialogue slot from the contextualized response.

In some embodiments, the unfilled dialogue slot is identified via a slot manager. In some embodiments, the slot manager performs operations including: the computing the dialogue intent classification of the dialogue input data; identifying a plurality slots required by the dialogue intent classification; and identifying a slot fill status associated with each of the plurality of slots, and the unfilled dialogue slot is identified based on the slot manager determining that the unfilled dialogue slot has an unfilled slot status.

In some embodiments, the dialogue input data is provided in response to the machine learning-based virtual dialogue system querying the user for the unfilled dialogue slot, and querying the user for the unfilled dialogue slot includes generating a dialogue message comprising one or more strings of text probing the user for the unfilled dialogue slot, and displaying the dialogue message via a user interface of the machine learning-based virtual dialogue system.

In some embodiments, the dialogue input data is provided by the user and includes one or more strings of unstructured text responding to the dialogue message.

In some embodiments, identifying the unfilled dialogue slot includes: searching a dialogue reference data structure based on the dialogue intent classification of the dialogue input data, identifying a plurality of slots required by the dialog intent classification based on the searching, computing, via a slot recognition machine learning model, one or more slot recognition inferences based on an input of the dialogue input data, wherein each of the one or more slot recognition inferences classifies a distinct set of one or more tokens underpinning the dialogue input data to one of the plurality of slots, determining that the dialogue input data does not include a set of one or more tokens classified to a subject slot of the plurality of slots based on an assessment of the one or more slot recognition inferences, and identifying the unfilled dialogue slot as the subject slot based on the determining.

In some embodiments, computing the dialogue intent classification of the dialogue input data includes: implementing a dialogue intent classification model that is configured to classify a string of text to one of a plurality of dialog intents recognizable by the machine learning-based virtual dialogue system, providing, to the dialogue intent classification model, an input comprising the dialogue input data, and computing, via the dialogue intent classification model, a dialogue intent classification inference comprising the likely dialogue intent classification of the dialogue input data based on the providing of the input.

In some embodiments, the dialogue input data is associated with a plurality of unfilled dialogue slots, including the unfilled dialogue slot and a second unfilled dialogue slot. In the some embodiments, the computer-implemented method further includes: prompting the user for the second unfilled dialogue slot; obtaining, from the user, a dialogue response to the prompting; computing a value of the second unfilled dialog slot based on the obtaining of the dialogue response, wherein computing the value of the second unfilled dialog slot includes: computing, via the question transformer model, a contextualized question for the second unfilled dialogue slot based on an input of a question-transform pairing comprising the likely dialogue intent classification and the second unfilled dialogue slot, computing, via the context transformer model, a contextualized response for the second unfilled dialogue slot based on an input of a context-transform pairing comprising the dialogue input data and the second unfilled dialogue slot, and computing, via the span prediction model, a slot value of the second unfilled dialogue slot based on an input of the contextualized question and the contextualized response computed for the second unfilled dialogue slot; and automatically executing the set of pre-determined computer-executable instructions based on computing the slot value of the unfilled dialogue slot and the slot value of the second unfilled dialogue slot.

In some embodiments, a computer-implemented method for improving a predictive response of a machine learning-based virtual dialogue system includes: identifying an unfilled dialogue slot associated with an active dialogue between a user and a machine learning-based virtual dialogue system; and computing a slot value of the unfilled dialogue slot based on the identifying, wherein computing the value of the unfilled dialogue slot includes: computing, via a span prediction machine learning model, a slot value answer inference identifying the value of the unfilled dialogue slot based on an input of a contextualized question and a contextualized response generated for the unfilled dialogue slot.

In some embodiments, the contextualized question is generated based on a dialogue intent of the active dialogue and the unfilled dialogue slot, and the contextualized response is generated based on user responses provided during the active dialogue and the unfilled dialogue slot.

In some embodiments, computing the contextualized question includes providing, to a question transformer model, an input comprising a target piece of dialogue input data included in the active dialogue and the unfilled dialogue slot, and generating, via the question transformer model, an output comprising the contextualized question based on the providing of the input.

In some embodiments, computing the contextualized response includes providing, to a context transformer model, an input comprising a dialogue intent classification of the dialogue input data and the unfilled dialogue slot, and generating, via the context transformer model, an output comprising the contextualized response based on the providing of the input.

In some embodiments, the computer-implemented method further comprises automatically updating, via a slot arbiter, a slot fill status of the unfilled dialogue slot from an unfilled slot status to a filled slot status based on the computing of the slot value of the unfilled dialogue slot.

In some embodiments, the span-prediction machine learning model is configured to (a) receive a question-context pairing comprising a target question and a knowledgebase for the target question and (b) extract an answer to the target question from the knowledgebase, and (c) output the answer extracted from the knowledge, the slot value of the unfilled dialogue slot corresponds to the answer extracted from the knowledgebase, and the input to the span-prediction machine learning model defines the contextualized question as the target question and the contextualized response as the knowledgebase for contextualized question.

In some embodiments, a computer program product embodied in a non-transitory machine-readable storage medium storing computer instructions that, when executed by one or more processors, perform operations comprising identifying a plurality of unfilled dialogue slots associated with an active dialogue between a user and a machine learning-based virtual dialogue agent; obtaining one or more subsequent dialogue inputs data based on prompting the user for the plurality of unfilled dialogue slots; and computing a slot value for each of the plurality of unfilled dialogue slots based on the obtaining of the one or more subsequent dialog inputs, wherein computing the slot value of each of the plurality of unfilled dialogue slots includes: computing, via a question-answering machine learning model, a plurality of slot answer inferences based on an input of a contextualized question and a contextualized response derived for each of the plurality of unfilled dialogue slots.

In some embodiments, computing the slot value of each of the unfilled dialogue slots further includes: computing, via a question transformer model, a contextualized question for each of the plurality of the unfilled dialogue slots based on an input of a question-transform pairing associated with each of the plurality of unfilled dialogue slots; and computing, via a context transformer model, a contextualized response for each of the plurality of unfilled dialogue slots based on an input of a context-transform pairing associated with each of the plurality of unfilled dialogue slots.

In some embodiments, a computer-implemented method for improving a predictive response of a machine learning-based virtual dialogue agent includes identifying an unfilled dialogue slot based on computing a likely dialogue intent of dialogue input data provided by a user; obtaining subsequent dialogue input data based on prompting the user for the unfilled dialogue slot; computing a value of the unfilled dialogue slot based on the obtaining of the subsequent dialog input, wherein computing the value of the unfilled dialogue slot includes: computing, via a question-generator machine learning model, a machine learning-derived query for the unfilled dialogue slot based on an input of a question transform pairing comprising the likely dialogue intent and the unfilled dialogue slot, computing, via a context-generator machine learning model, machine learning-derived context for the unfilled dialogue slot based on an input of a context transform pairing comprising the subsequent dialogue input data and the unfilled dialogue slot, and computing, via a question-answering machine learning model, a slot answer inference comprising the value of the unfilled dialogue slot based on an input of the machine learning-derived query and the machine learning-derived context computed for the unfilled dialogue slot; and automatically executing a set of pre-determined computer-executable instructions associated with the likely dialogue intent based on computing the value of the unfilled dialogue slot.

In some embodiments, the question-answering machine learning model is configured to receive a question-context pairing comprising a target question and a knowledgebase for the target question, the input to the question-answering machine learning model defines the machine learning-derived query as the target question and the machine learning-derived context as the knowledgebase, and the question-answering machine learning model computes the value of the unfilled dialogue slot by extracting an answer to machine learning-derived query from the machine learning-derived context.

In some embodiments, the context-generator machine learning model comprises a language transformer model that is configured to convert one or more tokens provided as input into one or more declarative statements or sentences, and computing the machine learning-derived context includes: providing the context transform pairing as input to the language transformer model, and generating, via the language transformer model, a question-context inference comprising the machine learning-derived context based on the providing.

In some embodiments, the machine learning-derived context includes declarative syntax and one or more prompts or sentences comprising tokens corresponding to the subsequent dialogue input data and the unfilled dialogue slot, and the question-answering machine learning model uses the machine learning-derived context as a knowledgebase for the machine learning-derived query.

In some embodiments, the question-generator machine learning model comprises a language transformer model that is configured to convert one or more tokens provided as input into a question, and computing the machine learning-derived query includes: providing the question transform pairing as input to the language transformer model, and generating, via the language transformer model, a question inference comprising the machine learning-derived query based on the providing.

In some embodiments, the machine learning-derived query includes interrogative syntax, at least one token corresponding to the likely dialogue intent, and at least one token corresponding to the unfilled dialogue slot, and the machine learning-derived query aids the question-answering machine learning model in extracting the value of the unfilled dialogue slot from the machine learning-derived context.

In some embodiments, the unfilled dialogue slot is identified via a slot manager, the slot manager performs operations including: the computing the likely dialogue intent of the dialogue input data; identifying a plurality slots required by the likely dialogue intent; and identifying a slot fill status associated with each of the plurality of slot, and the unfilled dialogue slot is identified based on the slot manager determining that the slot fill status of at least one of the plurality of slots relates to an unfilled slot status.

In some embodiments, the prompting of the user includes generating a dialogue message comprising one or more strings of text probing the user for the unfilled dialogue slot, and displaying the dialogue message via a user interface of the machine learning-based virtual dialogue agent.

In some embodiments, the subsequent dialogue input data is obtained from the user and includes one or more strings of unstructured text responding to the dialogue message.

In some embodiments, identifying the unfilled dialogue slot includes searching a dialogue reference data structure based on the likely dialogue intent of the dialogue input data, identifying a plurality of slots required by the likely dialog intent based on the searching, computing, via a slot recognition machine learning model, one or more slot recognition inferences based on an input of the dialogue input data, wherein each of the one or more slot recognition inferences classifies a distinct set of one or more tokens underpinning the dialogue input data to one of the plurality of slots, determining that the dialogue input data does not include a set of one or more tokens classified to a subject slot of the plurality of slots based on an assessment of the one or more slot recognition inferences, and identifying the unfilled dialogue slot as the subject slot based on the determining.

In some embodiments, computing the likely dialogue intent of the dialogue input data includes implementing a dialogue intent classification model that is configured to classify a string of text to one of a plurality of dialog intents recognizable, providing, to the dialogue intent classification model, an input comprising the dialogue input data, and computing, via the dialogue intent classification model, a dialogue intent classification inference comprising the likely dialogue intent of the dialogue input data based on the providing of the input.

In some embodiments, the dialogue input data is associated with a plurality of unfilled dialogue slots, including the unfilled dialogue slot and a second unfilled dialogue slot. In some embodiments, the computer-implemented method further comprises prompting the user for the second unfilled dialogue slot; obtaining, from the user, a dialogue response to the prompting; computing a value of the second unfilled dialog slot based on the obtaining of the dialogue response, wherein computing the value of the second unfilled dialog slot includes: computing, via the question-generator machine learning model, a machine learning-derived query for the second unfilled dialogue slot based on an input of a question transform pairing comprising the likely dialogue intent and the second unfilled dialogue slot, computing, via the context-generator machine learning model, machine learning-derived context for the second unfilled dialogue slot based on an input of a context transform pairing comprising the dialogue response and the second unfilled dialogue slot, and computing, via the question-answering machine learning model, a slot answer inference comprising the value of the second unfilled dialogue slot based on an input of the machine learning-derived query and the machine learning-derived context computed for the second unfilled dialogue slot; and automatically executing a set of pre-determined computer-executable instructions associated with the likely dialogue intent based on computing the value of the unfilled dialogue slot and the value of the second unfilled dialogue slot.

In some embodiments, a computer-implemented method for improving a predictive response of a machine learning-based virtual dialogue agent comprises identifying an unfilled dialogue slot associated with an active dialogue between a user and a machine learning-based virtual dialogue agent; obtaining subsequent dialogue input data based on prompting the user for the unfilled dialogue slot; and computing a value of the unfilled dialogue slot based on the obtaining of the subsequent dialog input, wherein computing the value of the unfilled dialogue slot includes: computing, via a question-answering machine learning model, a slot answer inference comprising the value of the unfilled dialogue slot based on an input of a machine learning-derived query and machine learning-derived context computed for the unfilled dialogue slot.

In some embodiments, the machine learning-derived query is computed based on a likely dialogue intent of the active dialogue and the unfilled dialogue slot, and the machine learning-derived context is computed based on the subsequent dialogue input data and the unfilled dialogue slot.

In some embodiments, computing the machine learning-derived query includes providing, to a question transformer model, an input comprising the subsequent dialogue input data and the unfilled dialogue slot, and generating, via the question transformer model, an output comprising the machine learning-derived query based on the providing of the input.

In some embodiments, computing the machine learning-derived context includes providing, to a context transformer model, an input comprising the likely dialogue intent and the unfilled dialogue slot, and generating, via the question transformer model, an output comprising the machine learning-derived context based on the providing of the input.

In some embodiments, the computer-implemented method further comprises automatically modifying, via a slot arbiter, a slot fill status of the unfilled dialogue slot from an unfilled slot state to a filled slot state based on the computing of the value of the unfilled dialogue slot.

In some embodiments, the question-answering machine learning model is configured to receive a question-context pairing comprising a question and a knowledgebase for the question and extract an answer to the question from the knowledgebase, the value of the unfilled dialogue slot corresponds to the answer extracted from the knowledgebase, and the input to the question-answering machine learning model defines the machine learning-derived query as the question and the machine learning-derived context as the knowledgebase for the machine learning-derived query.

In some embodiments, a computer-program product embodied in a non-transitory machine-readable storage medium storing computer instructions that, when executed by one or more processors, performs operations comprising identifying a plurality of unfilled dialogue slots associated with an active dialogue between a user and a machine learning-based virtual dialogue agent; obtaining one or more subsequent dialogue inputs data based on prompting the user for the plurality of unfilled dialogue slots; and computing a value for each of the unfilled dialogue slot based on the obtaining of the one or more subsequent dialog inputs, wherein computing the value of each of the unfilled dialogue slots includes: computing, via a question-answering machine learning model, a plurality of slot answer inferences based on an input of a machine learning-derived query and machine learning-derived context derived for each of the plurality of unfilled dialogue slots.

In some embodiments, computing the value of each of the unfilled dialogue slots further includes: computing, via a question-generator machine learning model, a machine learning-derived query for each of the plurality of the unfilled dialogue slots based on an input of a question transform pairing associated with each of the plurality of unfilled dialogue slots; and computing, via a context-generator machine learning model, machine learning-derived context for each of the plurality of unfilled dialogue slots based on an input of a context transform pairing associated with each of the plurality of unfilled dialogue slots.

BRIEF DESCRIPTION OF THE FIGURES

FIG. 2 illustrates an example method 200 in accordance with one or more embodiments of the present application;

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
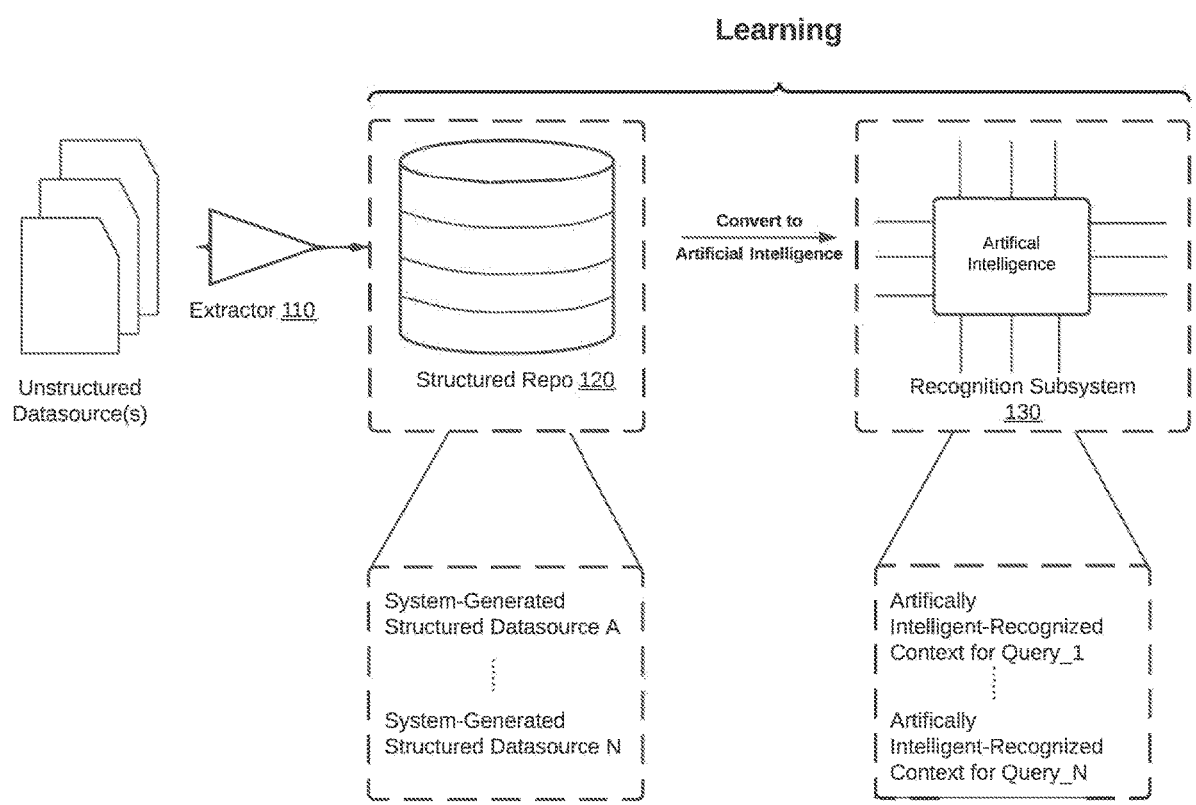
FIG. 1 illustrates a schematic representation of a system 100 in accordance with one or more embodiments of the present application.

1. System for Machine Learning-Based Context Identification, Query Handling and Automatic Response Generation As shown in FIG. 1, a system 100 that may be configured to implement an automated query handling using machine learning-based contextual parameters includes a structure extractor 110, a structured query response repository 120, and a context recognition response subsystem 130.

In one or more embodiments, the structure extractor 110 may be configured to identify and extract unstructured data from one or more sources of data and convert the unstructured data to one or more recognized structured data formats of the structured query response repository 120. In such embodiments, the structure extractor 110 may be in operable communication, via the Internet or the like, with one or more sources of unstructured data and similarly, in operable communication with one or more structured repositories of the system 100.

Additionally, or alternatively, the structure extractor 110 may function to implement one or more machine learning models including unsupervised machine learning models, such as a transformer model, for converting the unstructured data to vector representations mapped to an n-dimensional space. In one or more embodiments, the structure extractor may additionally identify and/or discover categories or topics of queries and responses based on an application of one or more machine learning-based clustering techniques. In such embodiments, the structure extractor 110 may function to apply contextual tags or labels based on the resulting clustering or grouping of the structured data.

The structured query response repository 120 may be configured to store formerly unstructured data from one or more sources of data in a structured format that may be suitable for intelligent querying applications. In one or more embodiments, the structured data may be stored in one or more of pre-defined hierarchies and/or tables. Additionally, or alternatively, the structured query response repository 120 may function to store contextual labels or tags, as metadata, in association with each structured response item. It shall be recognized that the structured query response repository 120 may function to implement any suitable data structure for organizing, structuring, and/or storing data.

Figure 3:
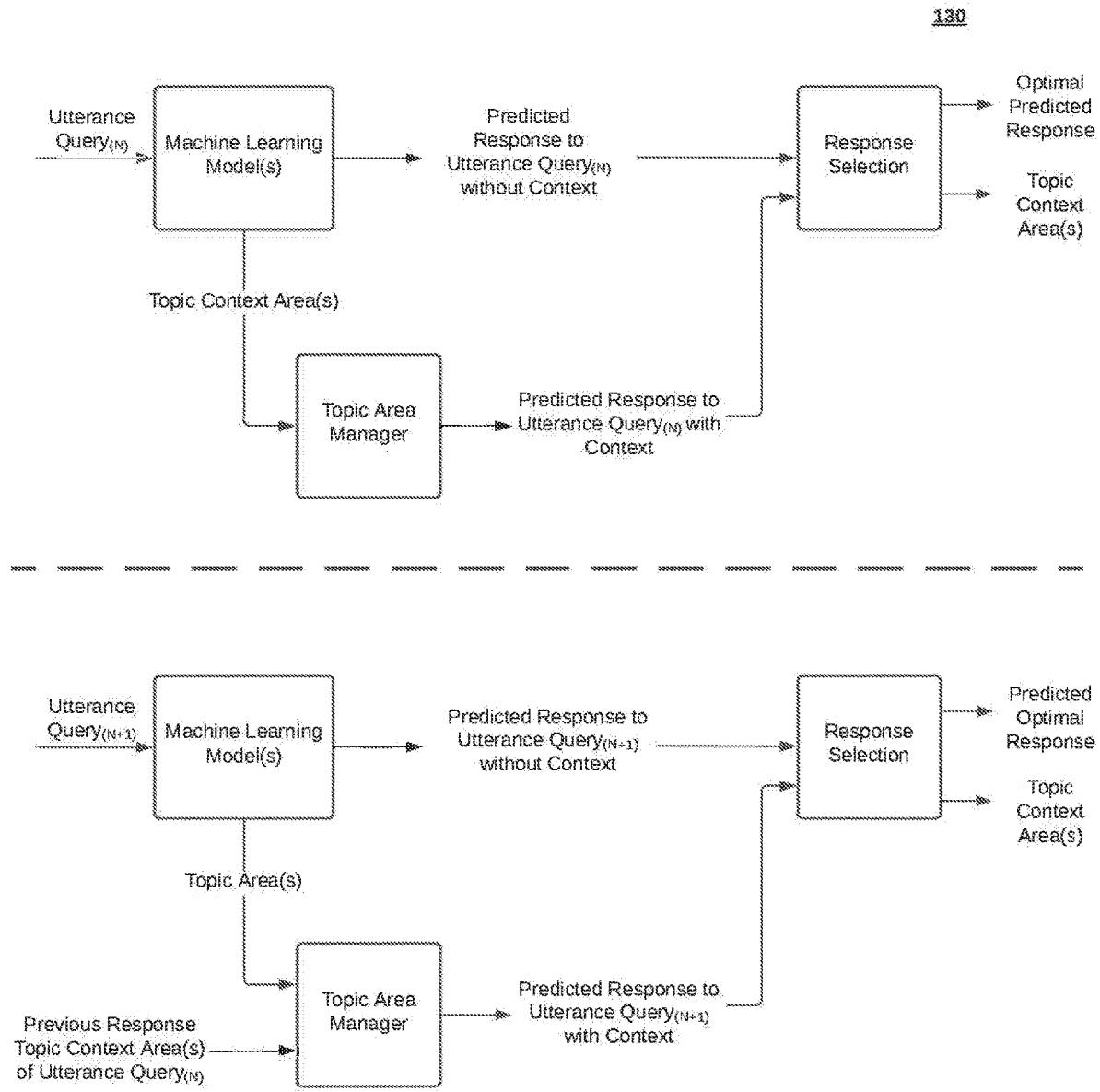
FIG. 3 illustrates an example mixed process flow and block diagram of a subsystem of system 100 in accordance with one or more embodiments of the present application.

In one or more embodiments, the context recognition response subsystem 130 may include a plurality of distinct query handling routes configured to handle a target query in either a contextless manner or in a manner with previous context (e.g., antecedent context), as illustrated by way of example in FIG. 3.

Additionally, or alternatively, the context recognition response subsystem 130 may implement one or more ensembles of pre-trained or trained machine learning models. The one or more ensembles of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), adversarial learning, and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation form transformers (BERT) for masked language model tasks and next sentence prediction tasks and the like, variations of BERT (i.e., ULMFiT, XLM UDify, MT-DNN, SpanBERT, RoBERTa, XLNet, ERNIE, KnowBERT, VideoBERT, ERNIE BERT-wwm, Mobile-BERT, TinyBERT, GPT, GPT-2, GPT-3, GPT-4 (and all subsequent iterations), ELMo, content2Vec, and the like), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be implemented in the various systems and/or methods described herein.

2. Method for Implementing a Machine Learning-Based Virtual Agent

As shown in FIG. 2, the method 200 for implementing a machine learning-based virtual agent system includes configuring a virtual dialogue system (S205), receiving input or a request from a user (S210), generating one or more requisite slot-informed questions (S220), deriving or identifying context for the one or more requisite slot-informed questions (S230), computing one or more requisite slot-informed question answers (S240), managing or modifying values for one or more slots (S250), and generating a response to the user (S260).

2.05 Configuring a Virtual Dialogue Agent

S205, which includes configuring a virtual dialogue agent, may function to configure (or encode) the virtual dialogue agent in accordance with configuration data defined by a subscriber. In one or more preferred embodiments, S205 may function to identify or receive the configuration data via a web-based user interface provided by the system 100. Accordingly, in such embodiments, the web-based user interface may include one or more user interface objects that enable S205 to receive the configuration data from the subscriber.

In some embodiments, the configuration data received or identified by S205 may be in a pre-defined format (e.g., JSON, XML, or the like) and/or may include data, such as attributes, parameters, or properties, that indicate configuration preferences of the subscriber. Exemplary content or parameters that may be included in the subscriber-provided configuration data will now be described below. However, it shall be noted that the configuration data may include additional, fewer, or different attributes, parameters, or properties in other embodiments without departing from the scope of the invention(s) contemplated herein.

In one or more embodiments, the configuration data may include data instructing S205 to encode and/or instantiate a particular type of virtual dialogue agent with capabilities for engaging in a dialogue and executing one or more tasks or operations within a desired domain. For instance, in a non-limiting example, the configuration data may include an attribute named "type" with a value "collect_and_confirm_slots" to request that S205 configure a virtual dialogue agent that may function to identify and extract one or more slot tokens or slot values from user input (e.g., utterances or queries) provided to the virtual dialogue agent, as will be described in greater detail herein. It shall be noted that, in the above example, if a different type of virtual dialogue agent is specified instead of "collect_and_confirm_slots," S205 would instead configure/initialize the different type of virtual dialogue agent.

Furthermore, in some embodiments, the configuration data may include data instructing S205 to configure the virtual dialogue agent to identify/recognize one or more dialogue intents. A dialogue intent of the virtual dialogue agent, as will be described in more detail herein, may relate to the subject, purpose, category, domain, sub-domain, or goal of an input provided to the virtual dialogue agent. In such embodiments, the configuration data may include an attribute named "intents" or "dialogue intents" that corresponds to a list containing one or more intent definitions (e.g., "intents": [ . . . ]).

An intent definition, in some embodiments, may include data specifying an intent name and a potential word/phase that a user may speak or otherwise provide to the virtual dialogue agent to invoke that intent (e.g., {"name": "appointment scheduling", "utterance": "I'd like to schedule an appointment"}). Accordingly, in embodiments where the intent definition list includes a plurality of intent definitions, S205 may function to configure the virtual dialogue agent to identify/recognize a plurality of intents.

Moreover, in some embodiments, the configuration data may include data for configuring the virtual dialogue agent to identify/recognize one or more slot values (e.g., key-value pairs). In other words, in some embodiments, the configuration data may include data that defines one or more slots associated with the one or more intents defined in the configuration data. Accordingly, in such embodiments, the configuration data may include an attribute named "slots" that corresponds to a list (e.g., array) containing one or more slot definitions (e.g., "slots": [ . . . ]).

A slot definition, in some embodiments, may include data specifying a slot name/label and one or more potential words/phrases that correspond to that slot (e.g., {"slot_name": "date", "phrases": ["date", "on date", "for date"]}). Accordingly, in embodiments where the slot definition list includes a plurality of slot definitions, S205 may function to configure the virtual dialogue agent to identify/recognize a plurality of slots.

It shall be noted that the above examples are not intended to be limiting and that the configuration data may include additional, fewer, or different parameters than the ones listed above. For instance, the configuration data may additionally, or alternatively, include data for configuring the messages/responses provided by the virtual dialogue agent, including the beginning/initial message provided by the virtual dialogue agent, intermediate messages provided by the virtual dialogue agent, final messages provided by the virtual dialogue agent, inquiry messages provided by the virtual dialogue agent, acknowledgement messages provided by the virtual dialogue agent, and/or the like.

Deploying a Virtual Dialogue Agent

In some embodiments, in response to (or based on) configuring the virtual dialogue agent in accordance with the configuration data defined by the subscriber, S205 may further function to deploy the virtual dialogue agent to a production environment associated with the subscriber. In some embodiments, once deployed to the production environment, the virtual dialogue agent may be capable of receiving input from and responding to queries associated with one or more users of the virtual dialogue agent (e.g., customers of the subscriber). That is, in some embodiments, after deploying the virtual dialogue agent to a production environment, one or more users may be able to provide text and/or utterance input to the virtual dialogue agent—as will be described in greater detail herein.

2.10 Query Classification: Dialogue Intent Inference

S210, which includes generating a dialogue intent inference, may function to compute a dialogue intent classification based on receiving or identifying input from a user interacting with the virtual dialogue agent deployed in S205. In some embodiments, the user input received by S210 may be input that is independent of other inputs previously provided to the virtual dialogue agent by the user and/or may be initial input provided to the virtual dialogue agent by the user. It shall be noted that, in some portions of the disclosure, this type of user input may be referred to as "stateless" or "contextless input." Alternatively, in some embodiments, the input received or identified by S210 may be input that is related to one or more other inputs or queries previously provided to the virtual dialogue agent by the user ("continued dialog input").

Root Classification: Null State or Contextless Classification

In one or more embodiments, after S210 receives user input, S210 may further function to compute a classification inference (e.g., dialogue intent classification inference) that may identify a dialogue intent of the received user input. That is, S210 may function to determine to which intent of the one or more intents recognizable by the virtual dialogue agent the received user input corresponds. In one or more embodiments, computing the dialogue intent classification inference for a target user input may include implementing one or more and/or an ensemble of dialogue classification machine learning models that may function to predict one or more potential dialogue intent classifications based on an input of an embeddings vector corresponding to the target user input.

It shall be noted that, in some embodiments, to compute an embedding vector for the received user input, S210 may function to implement an unsupervised machine learning model, such as a transformer model or an embeddings model, that may operate to convert text provided as input to a vector value in an n-dimensional space.

In some embodiments, after or based on converting the received user input to corresponding embedding vectors, S210 may function to determine the dialogue intent whose numerical vector or embedding representation is most similar (e.g., closest) to the vector representation of the received user input and, in turn, classify the received user input based on the intent corresponding to that dialogue intent. For instance, if S210 determines that a numerical vector representation of an utterance corresponding to a first dialogue intent is closest to the numerical vector representation of the received user input, S210 may function to classify the intent of the received user input as the first dialogue intent. Conversely, if S210 determines that a numerical vector representation of an utterance corresponding to a second dialogue intent is closest to the numerical vector representation of the received user input, S210 may function to classify the intent of the received user input as the second dialogue intent.

Generating Context Nexus Parameters

Additionally, or alternatively, S210 may function to identify and/or compute context nexus parameter values for the user input. As described in more detail in U.S. Provisional Application No.: 63/305,366, which is incorporated in its entirety by this reference, a context nexus preferably relates to a machine learning-derived artifact that includes one or more contextual parameter values that relate to at least one likely topic area or category associated with the received user input. In a preferred embodiment, a context nexus may include a first context nexus parameter (e.g., a category context nexus parameter) relating to top-level category or topic corresponding to the received user input and a second context nexus parameter (e.g., a sub-category context nexus parameter) relating to a low-level or sub-category or sub-topic within or intersecting the top-level category (e.g., {cat_param, sub-cat_param}).

Furthermore, as described in more detail in U.S. Provisional Application No.: 63/305,366, computing a context nexus for the received user input may include computationally mapping a numerical vector representation of the received user input (as described above) to a multi-dimensional space being defined by categorical and sub-categorial clusters of embedding or vector values that represent distinct query topic areas and query sub-topic areas. That is, in such embodiments, S210 may function to attribute or associate the embedding value of the received user input to at least one cluster of embedding values within the multi-dimensional space. In this way, S210 may function to identify at least one top-level category associated with at least one cluster and at least one sub-level category associated with a smaller or overlapping cluster based on the attribution.

Identifying Slot Values: Continued Dialog Classification

Additionally, or alternatively, in one or more embodiments, if or when a target user input may be identified as "continued dialog input," S210 may function to identify or extract one or more slot values (e.g., slot labels) associated with the received user input. In a preferred embodiment, S210 may function to generate one or more slot queries to the user based on a list of unfilled, required slots associated with the dialog intent of the continued dialog input. Accordingly, as a virtual agent system extracts and fills each requisite or required slot, S210 may function to update the list of unfilled, required slots to remove required slots that have been filled based on user inputs or utterances. For instance, in a non-limiting example, if a dialog intent of a continued dialog input is determined to be "scheduling appointment", S210 may function to identify the unfilled, required slots (e.g., "date", "location", and the like) associated with the scheduling appointment dialog intent based on a reference or a slot lookup of the dialogue reference data structure (e.g., the configuration data identified in S205). As described in more detail in the following sections, the method 200 may generate a slot-informed query (e.g., an AI or virtual agent query) for each unfilled, required slot (i.e., requisite slot) for performing a slot value extraction from a received user query or a user utterance.

2.20 Slot-Filling for Continued Dialogue: Slot-Informed Query Transformation

S220, which includes generating a slot-informed query, may function to perform at least part of a slot-filling task using an unsupervised machine learning model that may convert or transform a question transform pairing of dialogue intent classification of a current or previous user query and a requisite/required slot ({dialogue intent, slot N}) to a machine learning-derived query for computing an answer inference using a downstream question-answer prediction model. In a preferred embodiment, S220 may function to define a distinct question transform pairing for each slot N that may be required (e.g., unfilled, required slots) for successfully completing a slot-filling task for an identified dialogue intent of the user query. Accordingly, S220 may function to generate a slot-informed query for predicting an answer inference comprising a slot value (e.g., one or more tokens extracted from the contextual-answer) from an answer or knowledge bank (e.g., such as the contextual-answer described in S230) for each slot N. In a preferred implementation, the answer inference preferably includes a predicted slot value for each slot N together with an inference or prediction score indicating a confidence or a likelihood that the prediction for the slot value accurately matches the slot N.

In a preferred embodiment, the unsupervised machine learning model that transforms a question pairing to a requisite slot-informed question comprises a language transformer model, such as a question transformer model. In such preferred embodiments, S220 may function to provide a dialogue intent classification (label) of a user query together with a requisite slot for satisfying the dialogue intent of the user query, as model inputs, to the question transformer model. That is, implementing the question transformer model, S220 may function to convert a non-question (e.g., intent value and a required slot) to a question.

In turn, the question transformer model may function to perform a transformation of the parameters of the question transform pairing and/or derive, as output, a requisite slot-informed question that may be targeted for discovering or extracting a slot value from an answer bank for the requisite slot N (i.e., one of the parameters of the question transform pairing). For instance, in a non-limiting example, if S210 generates a dialogue classification intent for a received user query, such as "I would like to schedule an appointment", indicating that the user query may be of a "schedule appointment" intent and that a requisite slot for satisfying the intent includes a "location" slot, S220 may function to define a question transform pairing that includes the parameters or terms "schedule appointment" and "location"({schedule appointment, location}), as model inputs to the question transformer model. In response, the question transformer model may generate as output a question based on the terms provided as input, such as "What is the schedule appointment location?". An output of the question transformer model preferably includes a constructed question that may include the dialogue intent classification and the requisite slot in syntax for a properly phrased or worded interrogative sentence.

It shall be noted that the question transformer model may generate a different output when S220 provides different input terms/parameters to the question transformer model. For instance, if S220 would have instead determined that the received user input corresponds to a "send money" intent and a requisite slot for the "sending money" intent comprises a "destination" slot, S220 may function to provide the terms "send money" and "destination", as model input to the question transform model. Accordingly, in response, the question transformer model may generate a different question as compared to the above example, such as "What is the send money destination?".

Additionally, or alternatively, in some embodiments, S220 may function to generate a requisite slot-informed question for the user input received in S210 via question construction heuristics. In some such embodiments, S220 may function to construct a requisite slot-informed question by combining or concatenating a pre-defined question prefix with the intent and the requisite slot determined to be associated with the received user input (preferably combined in the above-mentioned order).

It shall be noted that, in some embodiments, a requisite slot-informed question may be generated or identified in one or more other ways without departing from the scope of the invention. For instance, in addition, or as an alternative, to the embodiments described above, S230 may function to identify a prompt or question previously asked to the user as the requite slot-informed question. That is, if the conversational dialogue agent previously prompted the user for a target slot, such as prompting the user for a source account slot (e.g., "What is the source account?") or the like, the method 200 may use the prompt generated by the conversational dialogue agent as the slot-informed question for the target slot.

Additionally, or alternatively, S220 may function to define a distinct question transform pairing for each distinct slot N associated with a given dialogue intent classification of a user query. In such embodiments, S220 may function to perform a slot lookup of the dialogue reference data structure for the one or more requisite slots for satisfying the given dialogue intent classification.

2.30 Slot-Filling Task for Continued Dialogue||Slot-Informed Context Transformation S230, which includes generating slot-informed contextual-answer data, may function to perform at least part of a slot-filling task using an unsupervised machine learning model that may convert a context transform pairing of a current or previous user query and a requisite slot ({query, slot N}) to contextual-answer data for computing an answer inference using a downstream question-answer prediction model. In a preferred embodiment, S230 may function to define a distinct context transform pairing for each slot N that may be required for successfully completing a slot-filling task for an identified dialogue intent of the user query.

As will be described in greater detail in S240, the computed or identified contextual-answer may be provided, along with the corresponding requisite slot-informed question, to a span prediction model, such as a question-answering machine learning model that may function to derive an answer (i.e., a slot value) to the provided requisite slot-informed question from the provided contextual-answer. It shall be noted that, in some portions of the disclosure, the contextual-answer generated along with a requisite slot-informed question may also be referred to as a "knowledge base for the requisite slot-informed question" (e.g., the source of information from which an answer can be obtain or derived).

In a preferred implementation, the unsupervised machine learning model that may function to transform a given context transform pairing may comprise a language transformer machine learning model, such as a context transformer model. In this preferred implementation, S230 may function to provide the parameters of the context transform pairing including the user query together with a requisite slot N associated with the dialogue intent of the user query, as model inputs, to the context transformer model.

In turn, the context transformer model may function to perform a transformation of the parameters of the context transform pairing and/or derive, as output, a contextual answer that may be evaluated using a requisite slot-informed question to extract one or more tokens as a slot value for a requisite slot N. In such embodiments, the generated context data may be used as knowledge bank or answer reference for the question-answering model. For instance, in a non-limiting example, if a user query or user utterance that is identified or received includes the phrase/utterance "Building 2" as user input and a requisite slot for satisfying a dialogue classification intent of the user utterance includes an "appointment location" slot, S230 may function to define a context transform pairing that includes the parameters or the terms "Building 2" and "appointment location" ({Building 2, appointment location}), as model inputs to the context transformer model. In response, the context transformer model may generate one or more tokens or sentences as possible contextual answers for the requisite slot-informed question. In such non-limiting example, the context transform pairing, {Building 2, appointment location}, may be transformed to the sentence "The appointment location is Building 2." That is, implementing the context transformer model, S230 may function to convert a user query to a non-query, knowledge bank, answer bank, or answer.

It shall be noted that different outputs may be generated when S230 provides different inputs to the context transformer model. For instance, if S230 would have instead determined that the received user input includes the phrase "checking account" and that the slot last requested, by the virtual dialogue agent, corresponds to a "source account" slot, S230 may function to provide the terms "checking account" and "source account" to the context transformer model. Accordingly, in response to the context transform model receiving the above-mentioned inputs, the context transformer model may generate a different context for the requisite slot-informed question, such as "The transfer source account is checking account."

It shall be noted that, in some embodiments, the output of the context transformer model may not always be used as the context for the requisite slot-informed question. For instance, in a non-limiting example, S230 may not use the output of the context transformer model as the context for the requisite slot-informed question if the received user input and the associated slot are semantically different. That is, S230 may function to use the input received in S210 as the context for the requisite slot-informed question (and not the output of the context transform model) if a numerical vector representation of the received user input and a numerical vector representation of the associated slot are more than (or less than) a threshold distance from each other. It shall be noted that numerical vector representations corresponding to the received user input and the associated slot may be computed by one or more of the unsupervised machine learning models previously described in S210 or system 100.

Furthermore, in a second non-limiting example, S230 may function to use the input received in S210 as the context for the requisite slot-informed question (and not the output of the context transform model) if the virtual dialogue agent has not previously requested the user to provide information for a target slot. That is, in some embodiments, a user's query or utterance may sufficiently include all required slot values for each requisite slot N, such that a context transformation of the user's query may be extraneous or redundant.

It shall be noted that context for a requisite slot-informed question may be generated in one or more other ways without departing from the scope of the invention. For instance, in addition, or as an alternative, to the embodiments described above, S230 may function to generate context for a requisite slot-informed question based on context generation heuristics, including (but not limited to) augmenting the user input received in S210 with a pre-defined answer prefix if the user input includes less than a pre-determined number of words or the like.

2.40 Computing a Slot-Informed Answer|Predicting a Slot Value+Inference Score

S240, which includes computing a slot value and slot inference score, may function to compute an answer comprising a slot value for a requisite slot N. Additionally, or alternatively, S240 may function to compute a corresponding slot inference score that preferably relates to a degree of confidence or a probability value that the predicted slot value correctly matches the requisite slot N. It shall be noted that, S240 may function to predict a slot value and a slot inference score for each distinct slot N and a given slot-informed question. That is, if a given dialogue intent classification for a user query or utterance requires multiple slots N to successfully address the user query, S240 may function to compute a distinct slot value and score by distinctly pairing a given contextual answer with each of the multiple slots. That is, in some embodiments, if S220 generated one or more requisite slot-informed questions, S240 may function to derive an answer to each of the one or more requisite slot-informed questions generated in S220 for a given context (that is, the context is not changed until multiple distinct slot value and score pairings are produced for the multiple distinct slots).

Figure 4:
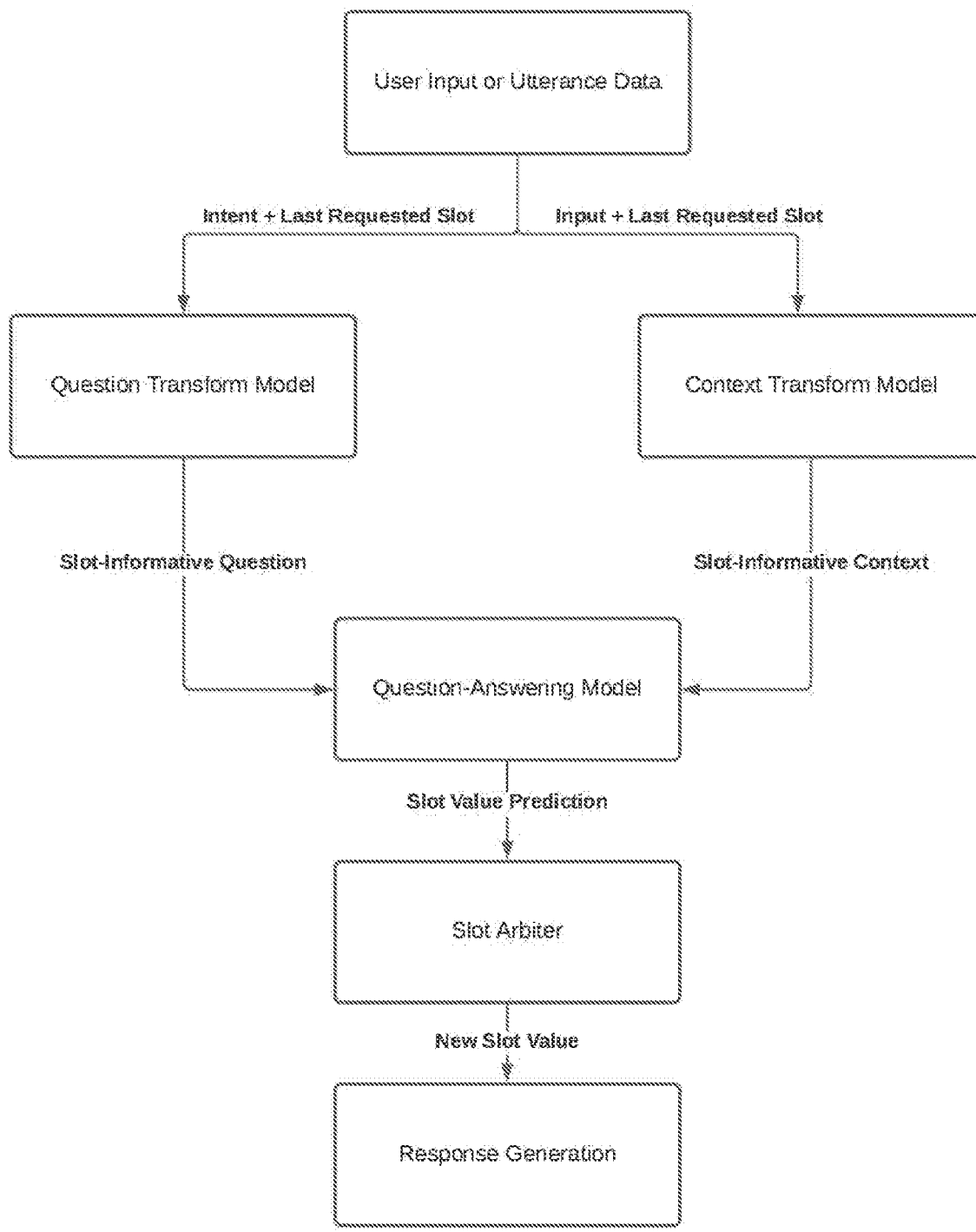
FIG. 4 illustrates an example process flow for evaluating input received from a user in accordance with one or more embodiments of the present application.

In some embodiments, to derive an answer to a requisite slot-informed question generated in S220, S240 may function to implement a span prediction model, such as a question-answering machine learning model, as shown generally by way of example in FIG. 4. In such embodiments, S240 may function to provide the slot-informative question generated in S220 and the context generated for the requisite slot-informed question in S230 to the question-answering machine learning model. In response to the question-answering machine learning model receiving the above-described inputs, the question-answering machine learning model may extract an answer (e.g., slot value) to the requisite slot-informed question from the provided context and/or produce a confidence score associated with the extracted answer.

For instance, in a non-limiting example, if S220 generated the requisite slot-informed question "What is the schedule appointment location?" and S230 generated as context for the requisite slot-informed question "The appointment location is Building 2" (for reasons previously described), S240 may function to provide the requisite slot-informed question and the corresponding context to the question-answering machine learning model. In response to the question-answering machine learning model receiving the above-mentioned inputs, the question-answering machine learning model may extract "Building 2" as an answer to the requisite slot-informed question with a respective amount of confidence. It shall be noted that the answer to the requisite slot-informed question, in some portions of the disclosure, may be referred to as the "predicted slot value," "computed slot value," or the like.

It shall also be noted in instances where S220 functions to generate a plurality of requisite slot-informed questions, S240 may function to generate an answer to each of the plurality of requisite slot-informed questions in analogous ways.

2.50 Slot Arbiter|Slot Manager

S250, which includes globally managing slot value assignments, may function to manage or update slot value assignments based on outputs produced by the above-described question-answering machine learning model. In a preferred embodiment, S250 may function to implement a slot arbiter or slot manager to assign values to the slots recognizable by the deployed virtual dialogue agent.

Additionally, or alternatively, in operation, the slot arbiter may function to identify all requisite slots for a given dialog intent associated with an active dialog between a user and a virtual agent and identify a fill status (i.e., filled, unfilled, etc.) of each requisite slot. In a circumstance in which the slot arbiter identifies that a requisite slot may be unfilled, a signal may be generated to encourage the slot-filling system or the like to extract a slot value (e.g., execute S220-S240). In the circumstance that all requisite slots are considered filled, S250 implementing the slot arbiter may generate a signal that encourages a completion response, such as a confirmation response that prompts the user to correct any slot value or finish the requested action (e.g., schedule appointment) and/or generate a completion or fulfilled response (S260) using the slot values (e.g., data filtered by the slots).

In some embodiments, the slot arbiter modifies/updates a current value of a slot based on output produced by the above-described question-answering machine learning model. For instance, in a non-limiting example, if S240 produced an answer to a requisite slot-informed question associated with a first slot (e.g., an "appointment location" slot), S250 may function to provide that answer to the slot arbiter. The slot arbiter, in turn, may compare the current value assigned to the first slot against the answer produced by the question-answering model, and if they correspond to different values, the slot arbiter may assign the answer produced by the question-answering model as the new slot value for the first slot.

It shall be noted that, in some embodiments, the slot arbiter may not update the value of a slot even if the current value of the slot and the answer produced by the question-answering machine learning model are different. For instance, in such embodiments and with continued reference to the above example, the slot arbiter may forgo replacing the current value assigned to the first slot with the answer produced by the question-answering model if the confidence score associated with the answer—as described in S240—is below a confidence score threshold. It shall also be noted that S250 may function to update other slots recognizable by the virtual dialogue agent in analogous ways described above.

Further in some embodiments, the slot arbiter may also function to resolve conflicts between answers produced by the question-answering machine learning model. For instance, in a non-limiting example, if S240 produces a same answer to a first requisite slot-informed question associated with a first slot (e.g., "source account" slot) and a second requisite slot-informed question associated with a second slot (e.g., "destination account" slot), S250 may function to provide the answers produced for the first and the second requisite slot-informed question to the slot arbiter. The slot arbiter, in turn, may function to assign (or update) the value of the first slot to the answer produced by the question-answering machine learning machine learning model if the confidence score associated with the answer to the first requisite slot-informed question is higher than the confidence score associated with the answer to the second requisite slot-informed question. Alternatively, in some embodiments, the slot arbiter may function to assign (or update) the value of the second slot to the answer produced by the question-answering machine learning machine learning model if the confidence score associated with the answer to the second requisite slot-informed question is higher than the confidence score associated with the answer to the first requisite slot-informed question.

Additionally, or alternatively, in some embodiments, the slot arbiter or manager may function to use an embedding of at least one of the user utterance, the machine learning-derived context, or the machine learning-derived query to inform a slot resolution of the one or more tokens extracted via the question-answering model. In such embodiments, the slot arbiter or manager may function to compute a plurality of embedding distances between the embedding of the at least one of the user utterance, the machine learning-derived context, or the machine learning-derived query and a plurality of slot resolution options, and associate the one or more tokens with a slot resolution option that has a shortest embedding distance to the at least one of the user utterance, the machine learning-derived context, or the machine learning-derived query. Furthermore, in some embodiments, the slot arbiter or manager may function to determine (e.g., infer or interpolate) a data type of one or more tokens extracted from a user input via the question-answering model. For instance, in a non-limiting example, based on the question-answering model extracting the token(s) March $3^{rd}$ from the user input, the slot arbiter, in turn, may function to represent the March $3^{rd}$ token(s) as a Unix timestamp.

2.60 Generating a Virtual Agent Response

S260, which includes generating a response, may function to generate a response to a user query based on an evaluation of one or more possible responses using the extracted slot values. In one implementation, S260 may function to identify a response template or the like by a reference to or a look up of the dialogue reference data structure (e.g., configuration data) for one or more slots being filled with one or more extracted slot values. In such implementation, S260 may function to interleave the extracted slot values into the one or more slots of the response template to create a possible virtual agent response. As described below for a target user query or user utterance, S260 may function to create a possible virtual agent response in a contextless manner and another possible virtual agent response in a contextful manner, which in turn may be the subject of a response comparison and selection for output.

That is, in some embodiments and as described in more detail in U.S. Provisional Application No.: 63/305,366, the method 200 may function to concurrently generate a contextless response and a contextful response for a subject user query. In turn, the method 200 may function to compare and/or assess a response score of the contextless response against a response score of the contextful response and select the response having the highest response score as the (optimal) response to the user query or utterance. It shall be noted that in circumstances where the contextful response score and the contextless response score are the same or substantially similar, the method 200 may function to provide the contextful response to the user query, which may aid in biasing the conversational dialogue agent to remain in a current dialogue flow or session with the user as opposed to exiting to a new dialogue flow or session.

3. Computer-Implemented Method and Computer Program Product

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

We claim:

1. A computer-implemented method for improving a predictive response of a machine learning-based virtual dialogue system, the computer-implemented method comprising:

identifying one or more required and unfilled dialogue slots associated with a dialogue intent classification in response to computing the dialogue intent classification for dialogue input data provided by a user;

executing a machine learning-derived context pairing operation using unsupervised learning models, including a transformer-based neural network, to transform the dialogue input data into slot-specific contextualized answers stored in an answer bank, wherein the answer bank is dynamically generated and includes the slot-specific contextualized answers and slot-specific contextualized questions as key-value pairs for predicting slot values in response to user queries, wherein executing the machine learning-derived context pairing operation includes:

extracting one or more slot values from the dialogue input data based on identifying the one or more required and unfilled dialogue slots, wherein identifying the one or more required and unfilled dialogue slots includes using the dialogue intent classification to perform a slot lookup, within a dialogue reference data structure, of the one or more required and unfilled dialogue slots that are stored in association with the dialogue intent classification, and (i) using the respective unfilled slot to predict, by a context transformer model, a likely answer to a prospective question about the respective unfilled slot by creating a context transform pairing between the dialogue input data and one dialogue slot of the one or more required and unfilled dialogue slots;

(ii) transforming the context transform pairing, by the context transformer model, to a slot-informed contextualized answer;

(iii) in response to the transformation of the context pairing, storing the slot-informed contextualized answer to the answer bank of a question-answering model;

(iv) using the respective unfilled slot to predict, by a question transformer model, a likely question for discovering a prospective answer containing the respective unfilled slot by creating a question transform pairing between the dialogue intent classification and the one dialogue slot of the one or more required and unfilled dialogue slots;

(v) transforming the question transform pairing, by a question transformer model, to a slot-informed contextualized question;

(vi) using the slot-informed contextualized question as input for questioning the question-answering model about the respective unfilled slot; and (vii) in response to receiving the slot-informed contextualized question about the respective unfilled slot, predicting by the question-answering model a distinct slot value for the respective unfilled slot based on the answer bank of the question-answering model;

implementing a slot arbiter that generates a signal prompting, via a user interface, a completion response for the respective unfilled slot, wherein the completion response includes a confirmation response to modify, via a user interface, the distinct slot value for the respective unfilled slot; and automatically executing a set of pre-determined computer-executable instructions for performing a task in response to or responding to the dialogue input data based on the computing the distinct slot value for each of the one or more required and unfilled dialogue slots associated with the dialogue intent classification of the dialogue input data provided by the user.

2. The computer-implemented method according to 1, wherein:

input of the slot-specific contextualized answer defines a source of an answer within the knowledgebase of the question-answering model.

3. The computer-implemented method according to 1, wherein:

the context transformer model comprises a language transformer model that is configured to convert one or more tokens provided as input into one or more contextualized declarative statements or sentences.

4. The computer-implemented method according to 1, wherein:

the slot-informed contextualized answer includes (a) declarative syntax and (b) one or more prompts or sentences comprising tokens corresponding to the dialogue input data and the one dialogue slot of the one or more required and unfilled dialogue slots, and the question-answering model uses the slot-informed contextualized answer as a knowledgebase for predicting an answer to the slot-informed contextualized question.

5. The computer-implemented method according to 1, wherein:

the question transformer model comprises a language transformer model that is configured to convert one or more non-question tokens provided as input into a question.

6. The computer-implemented method according to 1, wherein:

the slot-informed contextualized question includes (a) interrogative syntax, (b) at least one token corresponding to the dialogue intent classification, and (c) at least one token corresponding to the one dialogue slot of the one or more required and unfilled dialogue slots, and the slot-informed contextualized question aids the question-answering model in extracting the slot value of the one dialogue slot of the one or more required and unfilled dialogue slots from the slot-informed contextualized answer.

7. The computer-implemented method according to 1, wherein:

the one or more required and unfilled dialogue slots are identified via a slot manager, the slot manager performs operations including:

the computing the dialogue intent classification of the dialogue input data;

identifying one or more slots required by the dialogue intent classification; and identifying a slot fill status associated with each of the one or more slots, and the one or more required and unfilled dialogue slots are identified based on the slot manager determining that the one or more required and unfilled dialogue slots have a slot status indicating that one or more slot values have not been associated with the one or more required and unfilled dialogue slots.

8. The computer-implemented method according to 1, wherein:

the dialogue input data is provided in response to the machine learning-based virtual dialogue system querying the user for the one dialogue slot of the one or more required and unfilled dialogue slots, and querying the user for the one dialogue slot of the one or more required and unfilled dialogue slots includes:

generating a dialogue message comprising one or more strings of text probing the user for the one dialogue slot of the one or more required and unfilled dialogue slots, and displaying the dialogue message via the user interface of the machine learning-based virtual dialogue system.

9. The computer-implemented method according to 8, wherein the dialogue input data is provided by the user and includes one or more strings of unstructured text responding to the dialogue message.

10. The computer-implemented method according to 1, wherein identifying the one or more required and unfilled dialogue slots includes:

searching a dialogue reference data structure based on the dialogue intent classification of the dialogue input data, identifying one or more of a plurality of slots required by the dialog intent classification based on the searching, computing, via a slot recognition machine learning model, one or more slot recognition inferences based on an input of the dialogue input data, wherein each of the one or more slot recognition inferences classifies a distinct set of one or more tokens underpinning the dialogue input data to one of the one or more or of the plurality of slots, determining that the dialogue input data does not include a set of one or more tokens classified to a subject slot of the one or more or of the plurality of slots based on an assessment of the one or more slot recognition inferences, and identifying the one dialogue slot of the one or more required and unfilled dialogue slots as the subject slot based on the determining.

11. The computer-implemented method according to 1, wherein computing the dialogue intent classification of the dialogue input data includes:

implementing a dialogue intent classification model that is configured to classify a string of text to one of a plurality of dialog intents recognizable by the machine learning-based virtual dialogue system, providing, to the dialogue intent classification model, an input comprising the dialogue input data, and computing, via the dialogue intent classification model, a dialogue intent classification inference comprising the likely dialogue intent classification of the dialogue input data based on the providing of the input.

12. A computer-implemented method for improving a predictive response of a machine learning-based virtual dialogue system, the computer-implemented method comprising:

executing a machine learning-derived context pairing operation using unsupervised learning models, including a transformer-based neural network, to transform the dialogue input data into slot-specific contextualized answers stored in an answer bank, wherein the answer bank is dynamically generated and includes the slot-specific contextualized answers and slot-specific contextualized questions as key-value pairs for predicting slot values in response to user queries, wherein executing the machine learning-derived context pairing operation includes:
  extracting a plurality of slot values from a query of a user based on identifying a plurality of unfilled dialogue slots required for addressing a dialogue intent of the query, wherein identifying the plurality of unfilled dialogue slots includes using the dialogue intent classification to perform a slot lookup, within a dialogue reference data structure, of the plurality of unfilled dialogue slots that are stored in association with the dialogue intent classification,
  (i) using the respective unfilled slot to predict, by a context transformer model, a likely answer to a prospective question about the respective unfilled slot by creating a context-transform pairing between the query and the respective unfilled slot the plurality of dialogue slots required;
  (ii) transforming the context pairing, by the context transformer model, to a slot-informed contextualized answer;
  (iii) in response to the transformation of the context pairing, setting the slot-informed contextualized answer to the answer bank of a question-answering model;
  (iv) using the respective unfilled slot to predict, by a question transformer model, a likely question for discovering a prospective answer containing the respective unfilled slot by creating a question transform pairing between the dialogue intent classification and the one dialogue slot of the plurality of dialogue slots required;
  (v) transforming the question transform pairing, by a question transformer model, to a slot-informed contextualized question;
  (vi) using the slot-informed contextualized question as input for questioning the question-answering model about the respective unfilled slot; and
  (vii) in response to receiving the slot-informed contextualized question about the respective unfilled slot, predicting by the question-answering model a distinct slot value for the respective unfilled slot based on the answer bank of the question-answering model;
  implementing a slot arbiter that generates a signal prompting, via a user interface, a completion response for the respective unfilled slot, wherein the completion response includes a confirmation response to modify, via a user interface, the distinct slot value for the respective unfilled slot; and
  automatically executing a set of pre-determined computer-executable instructions for performing a task in response to or responding to the query based on the computing the distinct slot value for each of the plurality of dialogue slots required for addressing the dialogue intent of the query provided by the user.

13. The computer-implemented method according to claim 12, further comprising:
  automatically updating, via a slot arbiter, a slot fill status of the one dialogue slot of the plurality of dialogue slots required from an unfilled slot status to a filled slot status based on the computing of the slot value of the one dialogue slot of the plurality of dialogue slots required.

14. The computer-implemented method according to claim 7, wherein the slot manager updates the dialogue reference data structure to record a slot fill status for each unfilled dialogue slot, wherein the slot fill status is modified based on successful prediction of a slot value by the question-answering model.

15. The computer-implemented method according to claim 1, further comprising:
  computing, by the context transformer model, a plurality of alternative contextualized responses for the unfilled dialogue slot, and
  selecting a most probable contextualized response based on a confidence score computed by the question-answering model.

16. The computer-implemented method of claim 1, wherein the context transformer model generates the contextualized response by transforming a context-transform pairing of the dialogue input data and the unfilled dialogue slot into declarative syntax that includes tokens corresponding to the dialogue input data and the unfilled dialogue slot.

17. The computer-implemented method of claim 1, wherein the slot manager identifies the unfilled dialogue slot by searching a dialogue reference data structure associated with the dialogue intent classification and determining that the unfilled dialogue slot has an unfilled slot status based on the absence of corresponding tokens in the dialogue input data.

18. The computer-implemented method of claim 1, wherein the question transformer model generates the contextualized question by transforming a question-transform pairing of the dialogue intent classification and the unfilled dialogue slot into interrogative syntax comprising tokens corresponding to the dialogue intent classification and the unfilled dialogue slot.

19. The computer-implemented method of claim 1, further comprising generating, by the context transformer model, a contextualized response inference for the unfilled dialogue slot based on providing the context-transform pairing as input to the context transformer model, wherein the contextualized response inference serves as a knowledgebase for a question-answering machine learning model.

20. A computer-implemented method for improving a predictive response of a machine learning-based virtual dialogue system, the computer-implemented method comprising:
  identifying one or more required and unfilled dialogue slots associated with a dialogue intent classification in response to computing the dialogue intent classification for dialogue input data provided by a user;
  dynamically generating, by a context transformer model, a slot-specific contextualized answer comprising declarative syntax and tokens corresponding to the dialogue input data and the respective unfilled dialogue slot, the contextualized answer forming a key-value pair in an answer bank dynamically updated for the dialogue intent classification;
  generating, by a question transformer model, a slot-specific contextualized question comprising interrogative syntax and tokens corresponding to the dialogue intent classification and the respective unfilled dialogue slot for querying the answer bank;
  predicting, by a question-answering machine learning model, a slot value for each unfilled dialogue slot based on input of the slot-specific contextualized question and the slot-specific contextualized answer retrieved from the answer bank, wherein the prediction includes a confidence score;
  automatically updating, in real time, a slot fill status of each unfilled dialogue slot as "filled" or "unfilled"

based on the predicted slot value and the confidence score exceeding a predefined threshold;

implementing a slot arbiter that generates a signal prompting, via a user interface, a completion response for the slot value for each unfilled dialogue slot, wherein the completion response includes a confirmation response to modify, via a user interface, the slot value for each unfilled dialogue slot; and executing a set of computer-executable instructions for performing a task, the instructions being parameterized by the predicted slot values of the one or more required and unfilled dialogue slots.

* * * * *